Patented Sept. 29, 1936

2,056,046

UNITED STATES PATENT OFFICE 2,056,046

MANUFACTURE OF BASES DERIVED FROM BENZ-DIOXANE

Ernest Fourneau, Paris, France, assignor to Société des Usines Chimiques Rhone-Poulenc, Paris, France No Drawing. Application May 11, 1934, Serial No. 725,080. In Great Britain May 19, 1933

9 Claims. (Cl. 260—54)

This invention relates to the production of new bases derived from benz-dioxane which have valuable physiological properties.

There are very few substances known which have a paralyzing action on the sympathetic nervous system, and only two have been employed up to the present time, namely, yohimbine and ergotamine. Both these are natural products and there are very few synthetic substances possessing similar physiological properties.

According to the present invention it has been found that bases derived from benz-dioxane having the general formula:

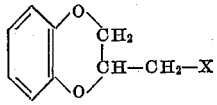

in which X is a member of the group consisting of

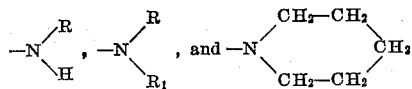

where R and R₁ are alkyl, possess a paralyzing action on the sympathetic nervous system to the extent not only of neutralizing that of adrenaline, but even of inverting it. Thus, for example, the injection of these bases in the form of their hydrochlorides or sulphates or in the form of any other salt, not only prevents adrenaline from showing its hypertensive action, but still further the injection of adrenaline following that of the bases in question brings about a considerable lowering of the blood pressure.

These bases are prepared by treating the benz-(chlormethyl) dioxane with organic primary or secondary amines. If desired the benz-(bromomethyl) dioxane may be used but its use presents no advantage.

The starting material may be obtained according to the following methods, but it is to be understood that these methods are illustrative and not limitative.

(1) Benz-(methylol) dioxane is obtained first by heating for 2 hours at 100° C. in an autoclave a mixture of:

| | Grams |
|---|---|
| Pyrocatechol | 110 |
| Epichlorhydrin | 110 |
| Caustic potash | 56 |
| Water | 100 |

The mass is taken up by ether, washed with dilute soda, the ethereal solution dried with anhydrous sodium sulphate, the ether distilled off and the residue fractionally distilled. The product boils at 160° C. under a pressure of 17 mm. The yield is 60% of theory.

The benz-(methylol) dioxane can be transformed into benz-(chlormethyl) dioxane in the following fashion:

A mixture of 165 grams benz-(methylol) dioxane, 80 grams pyridine, 120 grams thionyl chloride, is heated on the water bath for 2 hours. The product is then added to ice water, extracted with ether, the ethereal solution washed with dilute hydrochloric acid, the ethereal solution dried, the ether distilled off and the residue fractionally distilled. The boiling point of the product is 132° C. at 14 mm. Yield: 77% of theory.

If it is desired to use the benz-(bromomethyl)-dioxane, this may be prepared by heating for several hours in an autoclave at 100° C. a mixture of 1 molecular proportion of benz-(methylol)-dioxane and 1.5 molecular propertion of hydrobromic acid of 66% strength, but there appears to be no advantage to be gained by use of the bromo compound instead of the chloro compound.

(2) The epichlorhydrin described in method (1) may be replaced by glycerol-1.3-dichlorhydrin and the caustic potash may be replaced by caustic soda; this enables the preparation of epichlorhydrin to be avoided and the preparation can be carried out under atmospheric pressure without the use of an autoclave. Into an apparatus furnished with a stirrer and with a reflux condenser is introduced 1 kg. of pyrocatechol. The air contained in the apparatus is then replaced by nitrogen and a solution of 730 grams of caustic soda in 1820 grams of water is added and the mixture heated gently, until complete solution is obtained. Then when the temperature has reached 60° to 70° C. 1270 grams of glycerol-1.3-dichlorhydrin are introduced in small portions at a time, after which the product is heated for 3 hours to boiling without interrupting the current of nitrogen.

The preparation is then continued according to the method of operation described in the first method.

The following examples illustrate how the preparation of the bases may be carried out in practice, but it is to be understood that the invention is not limited to these examples:

*Example 1—Benz-(methylaminomethyl)-dioxane.*—A mixture of 100 grams of benz-(chlormethyl)-dioxane, 600 grams of a 10% solution of methylamine in benzene, is heated during 8 hours at 120–125° C. in an autoclave. The crystals of methylamine hydrochloride are separated, drained off and the bases extracted by dilute hydrochloric acid, and this dilute acid solution is washed with ether. The base is then liberated from the acid solution by means of soda, extracted with ether, the ethereal solution dried and the ether removed by distillation. The residue is then fractionally distilled, the boiling point of the product being 105–106° C. at a pressure of 0.75 mm. Yield:–65%. The hydrochloride has a melting point of 158–160° C. and is sparingly soluble in acetone.

*Example 2—Benz-(diethylaminomethyl)-dioxane.*—This base is obtained in a similar manner to that described in the previous example, except that diethylamine is used in place of methylamine. It boils at 117–118° C. at a pressure of 1.5 mm. The hydrochloride has a melting point of 127° C. and is moderately soluble in acetone.

*Example 3 — Benz - (piperidylmethyl) - dioxane.*—A mixture of 200 grams of benz-(chlormethyl), dioxane, 188 grams of piperidine and 2 grams of water is heated during 8 to 10 hours in an autoclave at 140–150° C. The base is then separated and purified according to the method described in Example 1. Yield: 80–85%. Benz-(piperidylmethyl)-dioxane boils at 193° C. at a pressure of 17 mm. The hydrochloride is a non-hygroscopic solid, sparingly soluble in anhydrous acetone and in absolute alcohol. This salt crystallizes from a mixture of equal parts of these two solvents in hexagonal tablets, melting at 229–231° C. and possesses a bitter taste.

What I claim and desire to secure by Letters Patent is:—

1. A process for the manufacture of bases derived from benz-dioxane by condensing benz-(halogen-methyl)-dioxane with amines of the general formula HX where X is a member of the group consisting of

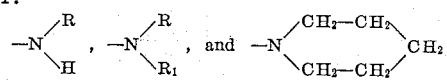

where R and R₁ are alkyl.

2. A process for the manufacture of bases derived from benz-dioxane by condensing benz-(chlor-methyl)-dioxane with amines of the general formula HX where X is a member of the group consisting of

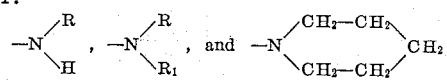

where R and R₁ are alkyl.

3. A process for the manufacture of benz-(methylaminomethyl)-dioxane by condensing benz-(chlormethyl)-dioxane with methylamine.

4. A process for the manufacture of benz-(diethylaminomethyl)-dioxane by condensing benz-(chlormethyl)-dioxane with diethylamine.

5. A process for the manufacture of benz-(piperidyl-methyl)-dioxane by condensing benz-(chlormethyl)-dioxane with piperidine.

6. As new products of manufacture the physiologically active bases having the general formula

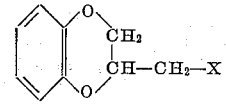

in which X is a member of the group consisting of:

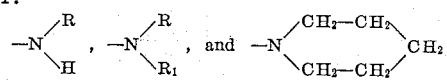

where R and R₁ are alkyl.

7. As a new product of manufacture the physiologically active benz-(methylaminomethyl)-dioxane.

8. As a new product of manufacture the physiologically active benz-(diethylaminomethyl)-dioxane.

9. As a new product of manufacture the physiologically active benz-(piperidylmethyl)-dioxane.

ERNEST FOURNEAU.